United States Patent [19]

Satoh et al.

[11] Patent Number: 4,823,333

[45] Date of Patent: Apr. 18, 1989

[54] OPTICAL DISK DUPLICATING APPARATUS USING SECTOR DATA IDENTIFICATION INFORMATION FOR CONTROLLING DUPLICATION

[75] Inventors: Isao Satoh, Neyagawa; Yoshihisa Fukushima, Osaka; Makoto Ichinose, Sakai; Yuzuru Kuroki, Toyonaka; Yuji Takagi, Neyagawa, all of Japan

[73] Assignee: Matsushita Electric Industrial Co., Ltd., Osaka, Japan

[21] Appl. No.: 3,832

[22] Filed: Jan. 16, 1987

[30] Foreign Application Priority Data

Jan. 21, 1986 [JP] Japan ................................. 61-10819
Jul. 29, 1986 [JP] Japan ................................. 61-178018

[51] Int. Cl.⁴ ............................................. G11B 7/28
[52] U.S. Cl. ..................................................... 369/84
[58] Field of Search ...................... 360/15, 25, 31, 48, 360/57; 369/54, 58, 47

[56] References Cited

U.S. PATENT DOCUMENTS 4,656,532  4/1987  Greenberg et al. .................... 360/48

FOREIGN PATENT DOCUMENTS 3611561  10/1986  Fed. Rep. of Germany ........ 360/57
57-172553  10/1982  Japan ..................................... 369/84
59-28248   2/1984  Japan ..................................... 369/47

*Primary Examiner*—Alan Faber
*Assistant Examiner*—James E. Tomassini
*Attorney, Agent, or Firm*—Stevens, Davis, Miller & Mosher

[57] ABSTRACT

An optical disk duplicating apparatus comprises reproducing means for reproducing user's data recorded on a first optical disk, adding means for adding sector data identification information indicative of the state of using sectors in recording tracks on the first optical disk to the reproduced user's data, recording means for recording the user's data on a second optical disk, and transfer means for transferring the user's data and the sector data identification information to the recording means. The optical disk duplicating apparatus determines whether each of the sectors in the first optical disk has data properly recorded therein, a defective sector identifier portion, a defective data field portion, or no signal recorded therein, by using the sector data identification information and controls a signal supplied to the recording means, thereby producing duplicated sectors in a manner such that the sectors in the first optical disk correspond respectively to the sectors in the second optical disk on the sector-to-sector basis.

7 Claims, 5 Drawing Sheets

(b)

OPTICAL DISK DUPLICATING APPARATUS USING SECTOR DATA IDENTIFICATION INFORMATION FOR CONTROLLING DUPLICATION

BACKGROUND OF THE INVENTION

2. Field of the Invention

The present invention relates to an optical disk duplicating apparatus for duplicating a second optical disk by reproducing the data recorded on a first optical disk having a sector composition, and also relates to the duplicated optical disk.

2. Description of the Related Art

FIG. 7 shows a block diagram of a prior art optical disk duplicating apparatus. In FIG. 7, reference numeral 50 designates a magnetic tape which stores user's data, 51 a magnetic tape drive, 52 a host CPU such as a minicomputer, 53 a magnetic disk drive having a large capacity, 54 a disk formatter, and 55 a disk recording section.

In the prior art optical disk duplicating apparatus having a structure such as mentioned above, the data to be recorded on an optical disk is supplied from the magnetic tape 50. The magnetic tape 50 having user's data recorded thereon is placed on and driven by the drive 51, and all the user's data are copied on the magnetic disk drive 53. The host CPU 52 reads the user's data from every sector, or sector by sector, in recording tracks on the magnetic disk in the magnetic disk drive 53, and transfers the user's data to the data formatter 54. The disk formatter 54 performs the generation of identifier signals for the sectors, the production of error correction codes for the user's data, and digital modulation, and the disk formatter 54 supplies the output formatted data to the disk recording section 55 to record the formatted data on an optical disk mounted on the disk recording section 55.

However, in the arrangement such as described above, since it is required to input the data signal to be written continuously with no interruption in synchronism with the operation of the disk recording section 55, it has been necessary to provide the magnetic disk drive 53 having a capacity equal to that of the optical disk or more. This has caused a problem such that a very expensive magnetic drive is needed in view of the recording capacity of the optical disk which is as great as several hundreds of megabytes.

SUMMARY OF THE INVENTION

In view of the problem mentioned above, it is an object of the present invention to provide an optical disk duplicating apparatus for duplicating user's data directly on an optical disk by using an optical disk, on which the user himself has recorded the data, without using a magnetic tape and a magnetic disk drive. In particular, the present invention provides an optical disk duplicating apparatus which effects a duplicating operation on the basis of using an optical disk having a marking signal recorded in a data field portion for identifying a defect in an identifier portion and the data field portion in each of sectors in recording tracks on the optical disk, and the present invention also provides a duplicated optical disk.

In the optical disk duplicating apparatus in accordance with the present invention, user's data are read out from every sector of a first optical disk having the user's data recorded thereon, and a recording state of the sector is added to the read-out user's data as the sector data identification information, and then the resultant user's data are transferred to a recording means for a second optical disk. The sector data identification information includes a data recorded sector flag for indicating that the user's data is properly recorded; a marking sector flag for indicating that a marking signal is recorded, which marking signal indicates that a sector identifier (hereinafter referred to as ID) portion having the information of a track address, a sector address, etc. of a sector is defective and that an error is detected in the recorded data through the read verification check; and an unrecorded sector flag indicating that data is not recorded. The recording means for the second optical disk controls the recording of data on the second optical disk on the basis of the sector data identification information.

DESCRIPTION OF THE PREFERRED EMBODIMENTS

Figure 1:
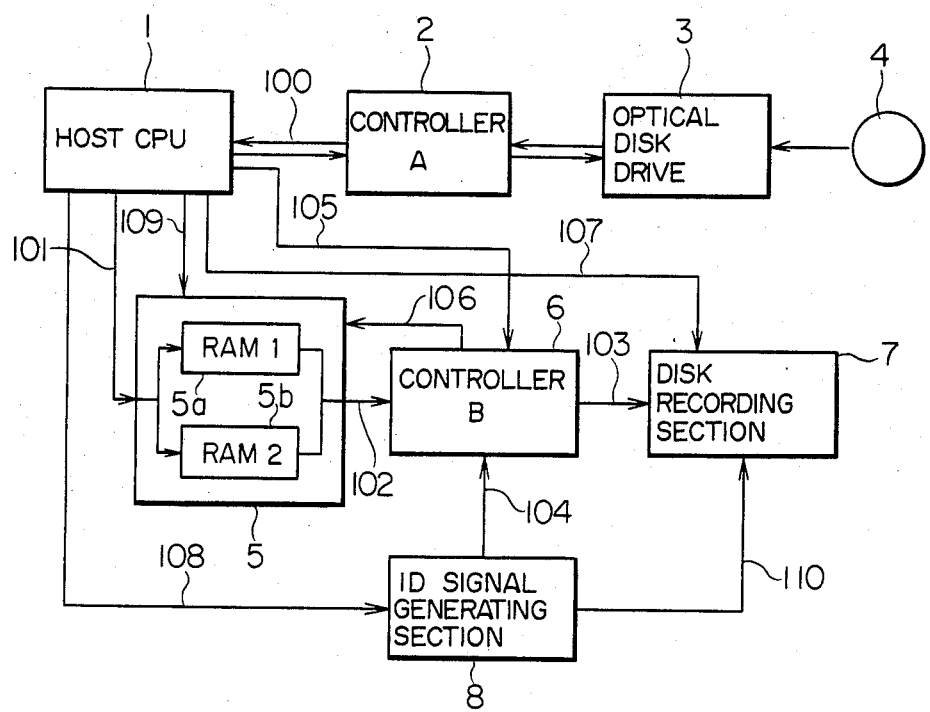
FIG. 1 is a block diagram of an optical disk duplicating apparatus of an embodiment of the present invention.

FIG. 1 is a block diagram showing an optical disk duplicating apparatus of an embodiment of the present invention. In FIG. 1, reference numeral 1 designates a host CPU for controlling the apparatus as a whole, 2 a controller A for controlling the reproduction of a first optical disk, 3 an optical disk drive for the first optical disk, 4 the first optical disk having data recorded by a user, 5 a memory for absorbing a variation in a data transfer speed between the first optical disk drive 3 and a disk recording section 7, 5a and 5b respectively designate RAM 1 and RAM 2 which constitute the memory 5 with a double buffer structure, 6 a controller B for generating a write data signal 103 for recording the data on a second optical disk, 7 the disk recording section for the second optical disk, and 8 an ID signal generating section for generating a sector identifier (ID) signal 104. Further, 100 designates data which are supplied from the controller A 2 and which have the sector data identification information included therein, 101 an input data to the memory 5 from the host CPU 1, 102 an output data from the memory 5, 103 a write data signal from the controller B 6, 104 the sector ID signal including the track address information and the sector address information, 105 a control status signal for the controller B 6, 106 a RAM changeover control signal for the memory 5, 107 a control status signal for the disk recording section 7, 108 a control status signal for the ID signal generating section 8, and 109 a control status signal for the memory 5. Further, 110 designates a clock signal for synchronizing the sector ID signal 104 with the rotation of the disk in the disk recording section 7.

Figure 2A:
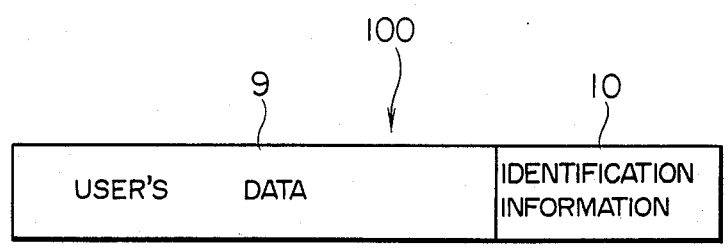
FIG. 2A is an explanatory diagram for explaining an example of data read into the host CPU 1 from the controller A 2 in FIG. 1.

FIG. 2A illustrates an embodiment of the present invention showing the format of the data 100 containing the sector data identification information which is read into the host CPU 1 from the controller A 2, wherein reference numeral 9 designates user's data and 10 designates the sector data identification information.

Figure 2B:
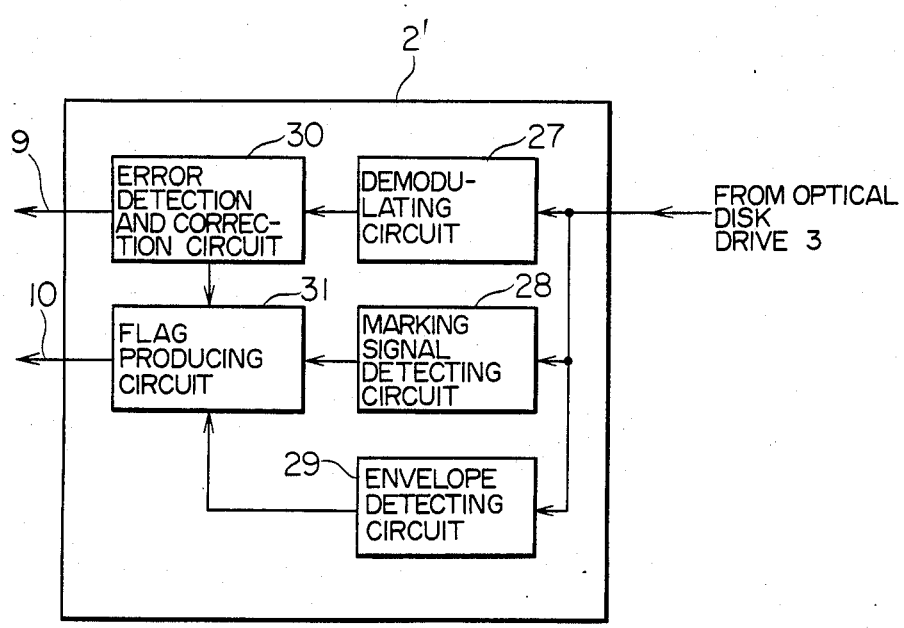
FIG. 2B is a block diagram for explaining the controller A 2 in FIG. 1.

FIG. 2B is a block diagram showing the structure of a sector data identification information producing section 2′ comprised in the controller A 2. In FIG. 2B, reference numeral 27 designates a demodulating circuit for demodulating a reproduced signal from the optical disk drive 3, 28 a marking signal detecting circuit for detecting a marking signal contained in the reproduced signal, and 29 an envelope detecting circuit for detecting an envelope of the reproduced signal. Further, 30 designates an error detection and correction circuit for performing the error detection and correction processing with respect to the demodulated reproduced signal thereby to produce the user's data 9. Reference numeral 31 designates a flag producing circuit which inputs the output signals from the error detection and correction circuit 30, marking signal detecting circuit 28, and envelope detecting circuit 29 and produces the sector data identification information 10 including a recording sector flag, marking sector flag and unrecorded sector flag.

Figure 3:
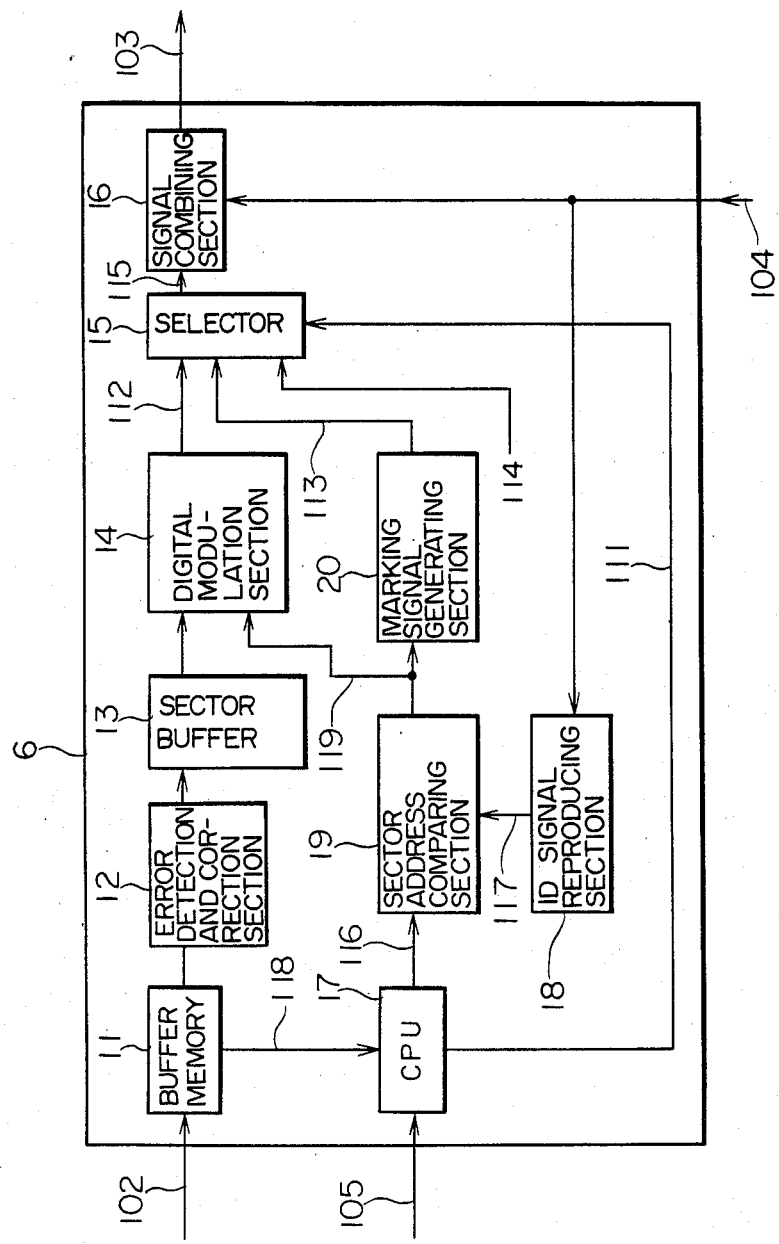
FIG. 3 is a detailed block diagram showing the controller B 6 in FIG. 1.

FIG. 3 is a block diagram showing a concrete embodiment of the controller B 6 in FIG. 1. In FIG. 3, reference numeral 11 designates a buffer memory for temporarily storing the output data 102 from the memory 5, 12 an error detection and correction section for adding an error correction code to the user's data 9, 13 a sector buffer for performing the signal transfer speed adjustment between the error detection and correction section 12 and the disk recording section 7, 14 a digital modulation section for performing the digital modulation including RLLC (run length limited code) modulation and the like on the user's data and the error correction code, 15 a selector for selecting one signal from among a digital modulation signal 112, a marking signal 113 and a non-modulation signal 114 as indicated by a signal selection signal 111, 16 a signal combining section for combining a selector output signal 115 with the sector ID signal 104, 17 a microcomputer (CPU) for performing the system control of the operation of the controller B 6, 18 an ID signal reproducing section for reproducing the sector ID signal 104 and outputting an address signal 117, 19 a sector address comparing section for making a comparison and detecting a coincidence between a desired address signal 116 from the CPU 17 and the address signal 117, and, upon detection of a coincidence therebetween, outputting a sector coincidence output 119 thereby to actuate the digital modulation section 14 and the marking signal generating section 20. When actuated by the sector coincidence output 119, the marking signal-generating section 20 generates the marking signal 113. Further, 118 designates a sector data identification signal read out from the buffer memory 11.

The operation of the optical disk duplicating apparatus of the embodiment of the present invention shown in FIG. 1 having the structure such as described above will be explained hereinafter.

(1) The host CPU 1 actuates the disk recording section 7 by the control status signal 107 and also actuates the ID signal generating section 8 by he control status signal 108.

(2) The host CPU 1 instructs the controller A 2 to read the data obtained from the optical disk 4.

(3) The controller A 2 sends a seek command to the optical disk drive 3, and the optical disk drive 3 retrieves a desired track.

(4) The controller A 2 reads a predetermined number of sectors from the desired track and transfers them to the host CPU 1. Here, the controller A 2 adds to the read user's data 9 the sector data identification information 10 obtained by the circuit 2′ shown in FIG. 2B, and sends the resultant data to the host CPU 1 as the data 100 containing the sector data identification information shown in FIG. 2A.

The production of the sector data identification information in the controller A 2 can be achieved easily in the following manner.

(a) The production of the data recording sector flag for indicating the normally recorded user's data.

By using the error correction code added to the user's data, it is decided whether the reproduced data are the correctly recorded user's data.

(b) The production of the marking sector flag indicating the record of the marking signal for showing the cases where:

① there is a defect in the ID portion containing the with respect to a track address, a sector address, etc. for the sector;

② an error is detected in the recorded data through the read verification check.

Depending on the length of an envelope of the reproduced signal and on the presence or absence of the marking signal, with respect to the cases of the aforementioned cases ① and ②, there are produced a marking sector flag (1) (when an envelope corresponding to the data and the marking signal is detected) and a marking sector flag (2) (when an envelope corresponding only to the marking signal is detected).

(c) The production of an unrecorded sector flag indicating that the data is not recorded.

A decision is made in accordance with an envelope of the reproduced signal.

(5) The host CPU 1 transfers the data read in the process (4) to the memory 5 as the input data 101. The data is written into either RAM 1 or RAM 2 whichever is connected to the host CPU 1.

(6) The host CPU 1 actuates the controller B 6 by the control status signal 105.

(7) While ascertaining by the control status signal 109 that the connection of the input data line 101 with the RAM 1 or RAM 2 in the memory 5 has been changed over properly, the host CPU 1 repeats the above-described processes (4) and (5) until the last track of the optical disk.

(8) The controller B 6 actuated by the control status signal 105 controls the changeover of the input/output connection of RAM 1 and RAM 2 so that the input data line 101 leading to the memory 5 is connected to RAM 1 or RAM 2 and simultaneously RAM 2 or RAM 1 is connected to the output data line 102, respectively, by the RAM changeover control signal 106.

(9) A shown in FIG. 3, the controller B 6 receives the data 100 containing the sector data identification information so as to be taken into the buffer memory 11 via the data output line 102 from the memory 5. On the other hand, the CPU 17 reads the sector data identification signal 118 sent from the memory 5 through the buffer memory 11 and analyzes the sector data identification information 10 shown in FIG. 2A.

(a) When the sector data identification information 10 contains the data recording sector flag, the CPU 17 in FIG. 3 outputs the signal selection signal 111 thereby to cause the selector 15 to select the digital modulation signal 112 from the digital modulation section 14.

The error detection and correction section 12 adds the error correction code produced therein to the user's data from the buffer memory 11 and supplies the resultant data to the sector buffer 13 so that the resultant data are written into the sector buffer 13. The CPU 17 sets the desired address signal 116 for the sector, in which the data are to be recorded, in the sector address comparing section 19 where the desired address signal 116 is compared with the address signal 117 obtained by demodulating the sector ID signal 104 in the ID signal reproducing section 18. When the demodulated sector ID signal 104 coincides with the desired address signal 116, the digital modulation section 14 is actuated by the sector coincidence output 119 from the sector address comparing section 19. As a result, the digital modulation section 14 performs digital modulation in synchronism with the rotation of the optical disk in the disk recording section 7 in FIG. 1. The digital modulation signal 112 is selected by the selector 15, and the selected digital modulation signal 112 is applied to the signal combining section 16. The signal combining section 16 adds the sector ID signal 104 to the digital modulation signal 112 and outputs the resultant signal to the disk recording section 7 in FIG. 1 as the write data signal 103.

(b) When the sector data identification information 10 contains the marking sector flag, the CPU 17 outputs the signal selection signal 111 thereby to cause the selector 15 to select the marking signal 113.

The CPU 17 sets the desired address signal 116 for the sector, in which the marking signal 113 is to be recorded, in the sector address comparing section 19 where the desired address signal 116 is compared with the address signal 117 obtained by demodulating the sector ID signal 104 in the ID signal reproducing section 18. When the demodulated sector ID signal 104 coincides with the desired address signal 116, the marking signal generating section 20 is actuated by the sector coincidence output 119 from the sector address comparing section 19. As a result, the marking signal generating section 20 generates the marking signal 113 in synchronism with the rotation of the optical disk in the disk recording section 7. The marking signal 113 is selected in the selector 15, and the selected marking signal 113 is applied to the signal combining section 16. The signal combining section 16 adds the sector ID signal 104 to the marking signal 113 and outputs the resultant signal to the disk recording section 7 as the write data signal 103.

(c) When the sector data identification information 10 contains the unrecorded sector flag, the CPU 17 outputs the signal selection signal 111 thereby to cause the selector 15 to select the non-modulation signal 114.

The CPU 17 sets the desired address signal 116 for the sector, in which the non-modulation signal 114 is to be recorded, in the sector address comparing section 19 where the desired address signal 116 is compared with the address signal 117 obtained by demodulating the sector ID signal 104 in the ID signal reproducing section 18. When the demodulated sector ID signal 104 coincides with the desired address signal 116, the sector coincidence output 119 is outputted. However, in this case, since the selector 15 has selected and outputted the non-modulation signal 114, only the sector ID signal 104 is outputted from the signal combining section 16 as the write data signal 103 and it is applied to the disk recording section 7. The non-modulation signal 114 performs recording of a guide groove having a predetermined depth on the optical disk.

The operation described above is carried out until the memory 5 becomes empty, and, as soon as it becomes empty, the RAM 1 and RAM 2 in the memory 5 are changed over from one to the other.

(10) When the host CPU 1 completes all the reading operations from the optical disk 4, the host CPU 1 outputs the control status signals 105, 107 and 108 thereby to cause the respective operations of the controller B 6, disk recording section 7, and ID signal generating section 8 to be stopped.

The rotational speed of the optical disk in the disk recording section 7 is set to be lower than that of the disk in the optical disk drive 3 in view of the transfer speed of the data from the controller A 2 through the host CPU 1 to the memory 5. Further, the RAM 1 and RAM 2 in the memory 5 have a sufficient capacity to allow sufficient time for the error recovery processing for any defect occurring in the optical disk 4 and any error occurring in the optical disk 4 and any error occurring in the optical disk drive 3. For example, the capacity to the RAM 1 and RAM 2 is determined to assure time allowance for making repeated tests of the error recovery processing for a seek error, read error of ID (identifier) of a sector, data ECC (error correction code) error, etc.

Figure 4:
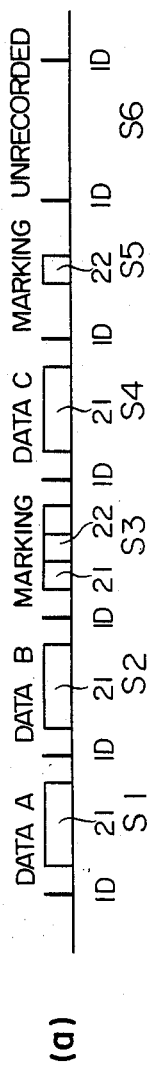
FIG. 4 is an explanatory diagram for explaining an example of recorded sectors of an optical disk according to the embodiment shown in FIG. 1.

FIG. 4 is a diagram illustrating examples of sectors recorded on the optical disk in the embodiment of the present invention. FIG. 4 (a) shows sectors recorded on the optical disk by a user, and FIG. 4 (b) shows a record form of sectors recorded on the second optical disk in the disk recording section 7. In FIG. 4, reference numeral 21 designates a data field signal in a data field portion, 22 a marking signal, and ID represents a sector identifier portion. In sectors S1, S2 and S4, user's data A, B and C are recorded respectively. In a sector S3 shown in FIG. 4 (a), the marking signal 22 is recorded to overlap the data field signal 21 as a result of the decision made by the read verification check that the data portion is defective. In a sector S5, only the marking signal 22 is recorded in an unrecorded data field portion as a result of a read error which has occurred when reading the sector ID portion. A sector S6 is an unrecorded sector where no signal has been recorded. As described in U.S. patent application Ser. No. 673,620 filed on Nov. 21, 1984 by M. Ichinose et al and entitled "Optical Information Recording and Reproducing Apparatus", the marking signal 22 is formed by the repeated recording of a pulse train whose length is sufficiently longer than record pits of the data. The marking signal 22 indicates that the associated sector is defective. The marking signal 22 can be detected easily and precisely through the envelope detection.

The controller A 2 produces the data recording sector flag for each of the sectors S1, S2 and S4; the marking sector flag for each of the sectors S3 and S5; and the unrecorded sector flag for the sector S6, respectively, as the sector data identification information.

The controller B 6 analyzes the sector data identification information and controls the recording on the second optical disk in the form shown in FIG. 4 (b) so that each of the sectors S1 to S6 corresponds respectively to each of the sectors S1 to S6 shown in FIG. 4 (a). In the sector S3, only the marking signal 22 is recorded without recording the data field signal 21, so that the form of the sector S3 in FIG. 4 (b) differs from that of the sector S3 in FIG. 4 (a). The sector S3 in FIG. 4 (b), takes the form similar to that of the sector S5 wherein the marking signal 22 is recorded on the unrecorded data field portion. With respect to the unrecorded sector, in the process of cutting a master disk for producing a replica disk, the irradiation of a laser beam of a predetermined intensity is effected in order to form a guide groove in the optical disk. While, in a preformatted optical disk in which the sector ID signal has been recorded thereon beforehand, an unrecorded sector is skipped without recording any signal on the data field portion thereof.

Figure 5:
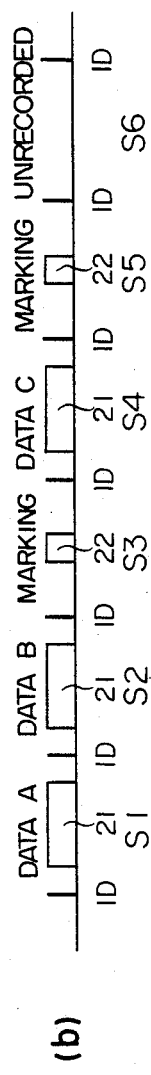
FIG. 5 is a diagram showing a composition of a data field portion in the present invention.
Figure 5:
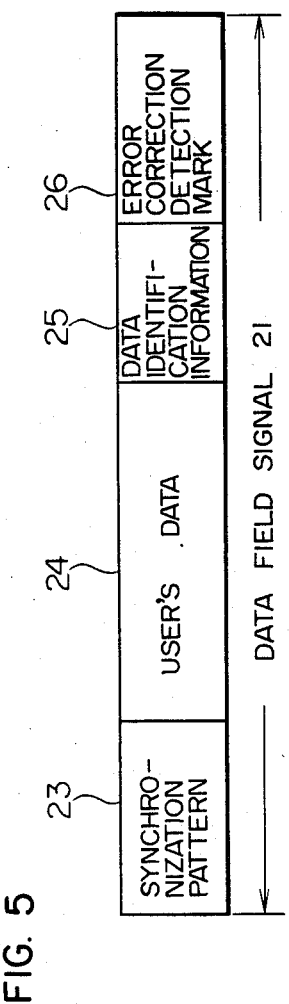

FIG. 5 shows a composition or an arrangement of the format of the data field signal 21 in the data field portion of an optical disk according to another embodiment of the present invention. In FIG. 5, reference numeral 23 designates a synchronization pattern for reproducing a clock signal, 24 the user's data, 25 the data identification information, and 26 an error correction detection code provided for the user's data 24 and the data identification information 25.

Figure 6:
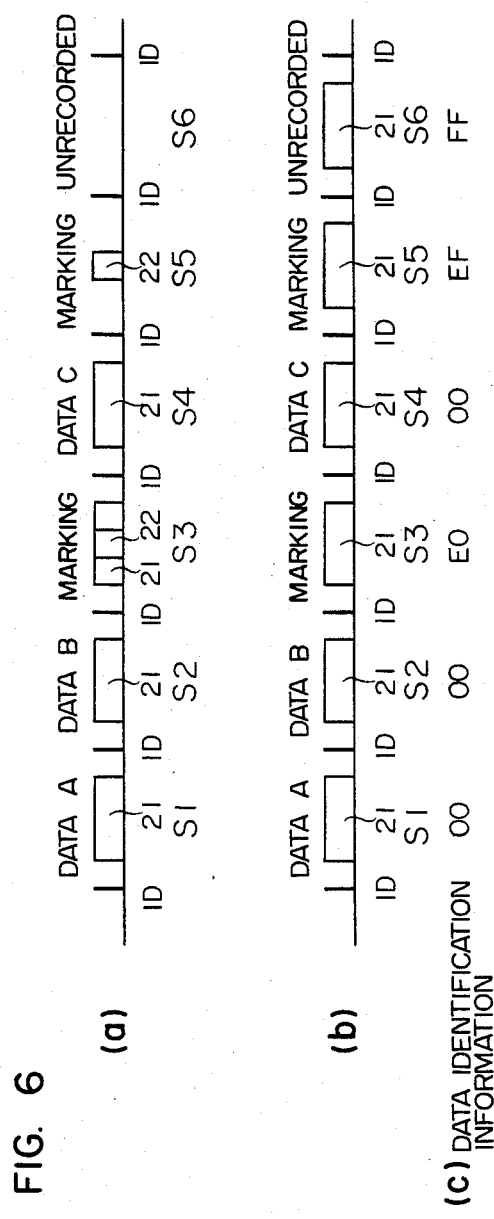
FIG. 6 is an explanatory diagram for explaining an example of recorded sectors in accordance with the composition shown in FIG. 5.
Figure 7:
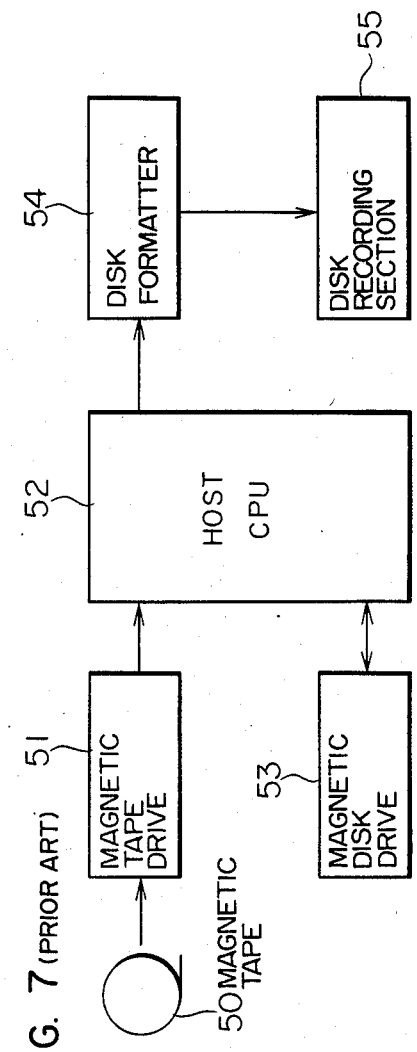
FIG. 7 is a block diagram of a prior art optical disk duplicating apparatus.

FIG. 6 shows examples of sectors recorded on an optical disk in accordance with the embodiment shown in FIG. 5. FIG. 6 (a) shows sectors recorded by a user in the same way as FIG. 4 (a). FIG. 6 (b) shows sectors of an optical disk duplicated by using the data field signal 21 shown in FIG. 5. FIG. 6 (c) shows an example of the content of the data identification information 25 in the data field signal 21 shown in FIG. 5.

In sectors S1, S2 and S4 shown in FIG. 6, there are recorded user's data A, B and C, respectively. In a sector S3 shown in FIG. 6, the marking signal 22 is recorded to overlap the data field signal 21 as a result of the decision made by the read verification check that the data portion is defective. In a sector S5, only the marking signal 22 is recorded in an unrecorded data field portion as a result of a read error which has occurred when reading the sector ID portion. A sector S6 is an unrecorded sector where no signal has been recorded.

The controller A 2 produces the data recording sector flag for each of the sectors S1, S2 and S4; the marking sector flag (1) indicating the marking on the data field signal 21 for the sector S3; the marking sector flag (2) indicating the marking in an unrecorded sector for the sector 5; and the unrecorded sector flag for the sector S6, respectively, as the sector data identification information.

The controller B 6 analyzes the sector data identification information and controls the recording on the second optical disk in the form shown in FIG. 6 (b) so that each of the sectors S1 to S6 corresponds respectively to each of the sectors S1 to S6 shown in FIG. 6 (a). In the recording in the sectors S1, S2 and S4 shown in FIG. 6 (b), user's data read from each of the sectors S1, S2 and S4 shown in FIG. 6 (a) by the data recording sector flag are respectively set into the user's data 24 in the data field signal 21 for the sectors S1, S2 and S4 shown in FIG. 6 (b), and further the mark "OO" for indicating that the user's data have been recorded therein is set into the data identification information 25 in the data field signal 21 for each of the sectors S1, S2 and S4 shown in FIG. 6 (b). In the recording in the sector S3 shown in FIG. 6 (b), in accordance with the marking sector flag (1), dummy data selected from the table of random numbers, for example, are set into the user's data 24 in the data field signal 21 for the sector S3 shown in FIG. 6 (b), and further the mark "EO" for indicating that the marking has been made in the data field signal 21 is set into the data identification information 25 in the data field signal 21 for the sector S3 shown in FIG. 6 (b).

In the recording in the sector S5 shown in FIG. 6 (b), since it is indicated by the marking sector flag (2) that here is no recording in the data field signal 21, in the same way as the sector S3, dummy data such as random numbers, etc. are set into the user's data 24 in the data field signal 21 for the sector S5 shown in FIG. 6 (b), and further the mark "EF" for indicating that the marking has been made in the unrecorded sector is set into the data identification information 25 in the data field signal 21 for the sector S5 shown in FIG. 6 (b).

In the recording in the unrecorded sector S6 shown in FIG. 6 (b), in accordance with the unrecorded sector flag, in the same way as the sectors S3 and S5, dummy data such as random numbers, etc. are set into the user's data 24 in the data field signal 21 for the sector S6 shown in FIG. 6 (b), and further the mark "FF" indicative of an unrecorded sector is set into the data identification information 25 in the data field signal 21 for the sector S6 shown in FIG. 6 (b).

With the structure as described above, the optical disk duplicated in the form shown in FIG. 6 (b) has the sector ID portions and data field portions formed in the shape of irregular pits extending on the whole surface of the optical disk. As a result, the amount of diffraction of light from each of the tracks is made uniform, so that the detection of a tracking error signal can be performed satisfactorily, which makes it possible to follow the track and to retrive data therefrom stably throughout the whole surface of the duplicated optical disk.

In accordance with the embodiments of the present invention described above, the addition of the sector data identification information to the data read from the optical disk 4 makes it possible to provide not only a sector in the optical disk in which the data have been recorded; but also a marking sector containing a mark for identifying a defective sector, in which the sector ID signal is defective, or in which the number of bit errors in the data detected by the read verification check exceeds a predetermined value, or the like defective sector; and an unrecorded sector having no signal recorded therein, with a corresponding sector ID signal, data modulation signal and marking signal, respectively, in synchronism with the rotation of the disk in the disk recording section 7. Further, in accordance with the embodiments of the present invention described above, since it is possible to read the data directly from a first optical disk and to record in a second optical disk in the disk duplicating apparatus, it is not necessary to use any large capacity magnetic disk drive, and, at the same time, it becomes possible to solve the problem that the recording capacity of an optical disk is restricted by the capacity of a magnetic disk drive.

Further, in the foregoing description, by replacing the memory 5, controller B 6, ID signal generating section 8, and disk recording section 7 by a second optical disk drive and a controller, it is possible to produce a duplicated optical disk by recording on an optical disk having preformatted sectors on the basis of sector-to-sector correspondence with a first optical disk.

As is understood from the foregoing description, in accordance with the present invention, it is possible for a user to record on a second optical disk directly from a first optical disk, which has been recorded beforehand by the user, without using an expensive magnetic tape drive, and therefore it becomes easy to manufacture an optical disk which is to be used exclusively for reproduction, by recording the user's data desired to be duplicated on an optical disk in an optical disk drive owned by the user and then by merely supplying the recorded optical disk to a manufacturer of duplicate optical disks. Besides, the present invention has a great practical effect from an economical point of view in that a magnetic tape drive, a magnetic disk of a great capacity, etc. become unnecessary.

We claim:

1. An optical disk duplicating apparatus for duplicating data from a first optical disk onto a second optical disk, said first optical disk having a plurality of sectors having data recorded therein, each of said sectors being composed of a sector identifier area having a sector identifier signal recorded therein and a data field area for recording data therein, the sectors of said first optical disk including a sector having data properly recorded in the data field area thereof and a sector having a marking signal recorded in the data field area thereof, said marking signal indicating that the sector in which it is recorded is defective, said apparatus comprising:

means for reproducing data from a said first optical disk;

means for examining a data field area of each reproduced sector to determine if it contains said marking signal;

means responsive to the examining means for producing a sector data identification information signal for each reproduced sector which identifies whether the data field area thereof contains recorded data or said marking signal, means responsive to said sector data identification information signal, for each reproduced sector, for forming a signal to be recorded in a data field area of a corresponding sector on a second optical disk, said signal to be recorded containing data reproduced from a data field of a reproduced sector of said first disk, or a marking signal, depending on the content of said sector data identification information signal, means for receiving the signal to be recorded for each sector and adding thereto a sector identifier signal to produce a recordable sector signal, and means for recording said recordable sector signal on a second optical disk in a sector which corresponds to a reproduced sector of said first optical disk from which said sector data identification information signal, used to form said recordable sector signal, was produced.

2. An optical disk duplicating apparatus as in claim 1 wherein said means for forming said signal to be recorded includes said sector data identification information signal as part of said signal to be recorded when said sector data identification information identifies recorded data of a reproduced sector of said first disk.

3. An optical disk duplicating apparatus according to claim 2, wherein said sector data identification information signal is one of:

a data-recorded sector flag when the data of a reproduced sector of said first optical disk is reproduced normally by said data reproducing means; and a marking sector flag when the marking signal is detected in a reproduced sector;

wherein said means for forming a signal to be recorded includes means for including the sector data identification information as part of said signal to be recorded when said sector data information signal is said data-recorded sector flag.

4. An optical disk duplicating apparatus according to claim 3, further comprising means operative when the sector data identification information is a data-recorded sector flag, for adding an error correction code to reproduced data and the sector data identification information and then modulating the resultant data to form said signal to be recorded, and means operative when the sector data identification information is a marking sector flag for generating a marking signal as said signal to be recorded.

5. An optical disk duplicating apparatus according to claim 3, further comprising:

a sector identifier signal generating means for generating said sector identifier signal;

means operative when the sector data identification information is a data-recorded sector flag for adding an error correction code to the reproduced data and the sector data identification information and then modulating the resultant data to form said signal to be recorded; and sector synchronizing means for operating said data recording means in synchronism with address information in the sector identifier signal, thereby generating the data modulation signal to be recorded in synchronism with the sector identifier signal so that the data modulation signal to be recorded is recorded on said corresponding sector of said second optical disk.

6. An optical disk duplicating apparatus according to claim 3, further comprising:

sector identifier signal generating means for generating said sector identifier signal;

marking signal generating means for generating a marking signal when the sector data identification signal is a marking sector flag; and sector synchronizing means for operating said marking signal generating means in synchronism with address information in the sector identifier signal, thereby generating the marking signal in synchronism with the sector identifier signal so that the marking signal is recorded on said corresponding sector of said second optical disk.

7. An optical disk duplicating apparatus according to claim 3, wherein said sector data identification information can also be an unrecorded sector flag when no data is recorded in a reproduced sector, said apparatus further comprising:

selecting means for selecting one of a data modulation signal which includes reproduced data and said sector data identification information, the marking signal, and a non-modulated signal as an output signal thereof in accordance with the sector data identification information; and signal combining means for combining the output signal from said selecting means with said sector identifier signal to produce said recordable sector signal.

* * * * *